United States Patent Office 2,758,052
Patented Aug. 7, 1956

2,758,052

1 - BENZOYL - 2 - (4 - CHLOROPHENYL) HYDRAZINE FUNGICIDAL COMPOSITION AND METHOD OF APPLYING TO PLANTS

Allen E. Smith, Oxford, George E. O'Brien, Bethany, and Adelaide Bornmann, New Haven, Conn., assignors to United States Rubber Company, New York, N. Y., a corporation of New Jersey No Drawing. Application March 17, 1953,
Serial No. 342,982

5 Claims. (Cl. 167—30)

This invention relates to new and useful improvements in fungicides. The invention further relates to methods of treating growing plants, and to methods of protecting organic material subject to attack by microorganisms, as the immunizing of seed.

We have found that 1-benzoyl-2-(chlorophenyl) hydrazine is an effective fungicide.

The 1-benzoyl-2-(4-chlorophenyl) hydrazine may be made by reacting equal molar amounts of para-chlorophenylhydrazine and a halide, anhydride or ester of benzoic acid.

The 1-benzoyl-2-(4-chlorophenyl) hydrazine may be used as a seed protectant and disinfectant, and to protect growing plants from fungus infection. It may be applied to seeds or plants directly, or in an inert medium as a dust in admixture with a powdered solid carrier, such as the various mineral silicates, e. g., mica, talc, pyrophyllite and clays. It may be applied as an aqueous spray in suspension in water. It may be applied in admixture with a small amount of a surface-active agent which may be an anionic surface-active agent, a nonionic surface-active agent, or a cationic surface-active agent, and which acts as a wetting agent for the chemical. Such surface-active agents are well known and reference is made to U. S. Patent 2,547,724, columns 3 and 4, for more detailed examples of the same. The 1-benzoyl-2-(4-chlorophenyl) hydrazine may be applied as in foliage treatment in an aqueous suspension containing such a surface-active agent as a dispersing agent. The chemical may also be admixed with powdered solid carriers, such as mineral silicates, together with a small amount of a surface-active agent so that a wettable powder may be obtained which may be applied directly to plants, or it may be shaken up with water to readily prepare a suspension of the chemical (and powdered carrier) in water for application to plants in that form. The chemicals may be applied to the plants by the aerosol method.

The following is illustrative of the preparation of the 1-benzoyl-2-(4-chlorophenyl) hydrazine:

A solution of 8.4 grams of benzoyl chloride in 40 ml. of anhydrous ether was added slowly to a stirred solution of 8.4 grams of para-chlorophenylhydrazine and 7 grams of pyridine in 150 ml. of anhydrous ether. After refluxing for one hour, 100 ml. of water was added and the mixture stirred for two hours. The solid product was separated by filtration; to it was added that portion obtained by evaporation of the ether layer. It was recrystallized from benzene to give 7.3 grams of colorless matted needles melting at 151–151.5° C.

The effectiveness of 1-benzoyl-2-(chlorophenyl) hydrazine as a fungicide is illustrated in the following examples:

*Example I*

The 1-benzoyl-2-(4-chlorophenyl) hydrazine was ground with 7.5% by weight of the chemical of an alkyl phenoxy polyoxyethylene ethanol (monoether of a polyglycol with an alkylated phenol) which is a surface-active agent known to possess no fungicidal properties in the amount used. The mixture of 1-benzoyl-2-(4-chlorophenyl) hydrazine and surface-active agent was dispersed by agitating in distilled water at a concentration of 2000 parts per million of the 1-benzoyl-2-(4-chlorophenyl) hydrazine.

Duplicate six-inch tomato plants of the variety Bonny Best were sprayed for 20 seconds at 20 lbs. pressure with the thus prepared aqueous suspension of 1-benzoyl-2-(4-chlorophenyl) hydrazine. After the spray deposit was thoroughly dry (24 hours), the plants and four comparable untreated (check) plants were sprayed with an aqueous suspension of spores of the early blight fungus (*Alternaria solani*). The plants were held for 24 hours at 21° C. and 100% relative humidity to permit spore germination and host infection before removing the plants to the greenhouse. Records were taken five days later on the number of lesions produced on the fifteen major leaflets of the three youngest fully expanded leaves. The data were converted to percentage control on the basis of the average number of fungus lesions on the four check plants. The plants treated with the 1-benzoyl-2-(4-chlorophenyl) hydrazine showed 94% control of the fungus.

*Example II*

A 1% suspension of 1-benzoyl-2-(4-chlorophenyl) hydrazine was prepared by dispersing 300 mg. of the chemical, previously ground with a small amount of the surface-active agent used in Example 1 in 30 ml. of water.

Two sections of green banana, one being a ¼ inch cross section and the other being a section of banana skin one inch square, were treated by immersing for approximately 10 seconds in the 1% solution of 1-benzoyl-2-(4-chlorophenyl) hydrazine.

Six untreated sections of green banana, four being ¼ inch cross sections and two being sections of skin one inch square, were used as controls.

Each section was placed on top of filter paper in a sterile petri plate. The petri plates were then placed on a revolving table and inoculated for a period of 1 minute with a suspension containing approximately 50,000 spores per ml. Spores used were *Thielaviopsis paradoxa* which causes stalk rot of bananas. After inoculation petri plates were covered and placed in an oven at 28° C. to incubate.

In observations made five days later both sections treated with 1-benzoyl-2-(4-chlorophenyl) hydrazine gave 100% disease control while the six untreated sections showed no disease control.

Having thus described our invention, what we claim and desire to protect by Letters Patent is:

1. A fungicidal composition comprising 1-benzoyl-2-(4-chlorophenyl) hydrazine and a fungicidal adjuvant therefor, said adjuvant comprising a surface-active wetting agent.

2. The fungicidal composition of claim 1 in which the adjuvant includes a powdered solid carrier.

3. The method of controlling fungi on plants which comprises applying to plants that are subject to attack by fungi a fungicidal amount of 1-benzoyl-2-(4-chlorophenyl) hydrazine.

4. The method for suppressing the growth of fungi on living plants which comprises spraying living plants that are subject to attack by fungi with a fungicidal amount of 1-benzoyl-2-(4-chlorophenyl) hydrazine.

5. The method for suppressing the growth of fungi on living plants which comprises spraying living plants that are subject to attack by fungi with a fungicidal amount of an aqueous suspension of 1-benzoyl-2-(4-chlorophenyl) hydrazine.

References Cited in the file of this patent

FOREIGN PATENTS 460,521    Great Britain ------------------ 1937

OTHER REFERENCES

Siegler et al.: Journal of Econ. Entomology, vol. 39, No. 3, June 1946, pages 416, 417.

Brown, A. W. A.: Insect Control by Chemicals, 1951, pages 65, 66, 574–578.